United States Patent
Darbyshire et al.

(10) Patent No.: US 11,992,845 B2
(45) Date of Patent: May 28, 2024

(54) REAGENT CASSETTE

(71) Applicant: LEICA BIOSYSTEMS MELBOURNE PTY LTD, Mount Waverley (AU)

(72) Inventors: Paul Darbyshire, Melbourne (AU); Maxim Stanislaw Pamieta, Melbourne (AU); Mark Wilcock, Melbourne (AU); Gregory William Boyes, Melbourne (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 213 days.

(21) Appl. No.: 17/278,982

(22) PCT Filed: Dec. 13, 2019

(86) PCT No.: PCT/AU2019/051375
§ 371 (c)(1),
(2) Date: Mar. 23, 2021

(87) PCT Pub. No.: WO2020/118378
PCT Pub. Date: Jun. 18, 2020

(65) Prior Publication Data
US 2022/0032307 A1    Feb. 3, 2022

(30) Foreign Application Priority Data
Dec. 14, 2018 (AU) ................................ 2018904754

(51) Int. Cl.
*B01L 3/00* (2006.01)
*G01N 1/31* (2006.01)
(Continued)

(52) U.S. Cl.
CPC ............... *B01L 3/527* (2013.01); *B01L 3/523* (2013.01); *G01N 1/312* (2013.01);
(Continued)

(58) Field of Classification Search
CPC .. B01L 3/527; B01L 3/523; B01L 3/52; B01L 3/02; B01L 2200/14;
(Continued)

(56) References Cited

U.S. PATENT DOCUMENTS 5,862,934 A   1/1999  Sattler et al.
8,282,895 B2  10/2012 Miller et al.
(Continued)

FOREIGN PATENT DOCUMENTS

CN    1726275 A    1/2006
CN  105032521 A   11/2015
(Continued)

OTHER PUBLICATIONS

Extended European Search Report dated Oct. 18, 2021 from the European Patent Office in European Application No. 19895127.9.
(Continued)

*Primary Examiner* — Matthew D Krcha
*Assistant Examiner* — Tingchen Shi
(74) *Attorney, Agent, or Firm* — Sughrue Mion, PLLC

(57) ABSTRACT

A cassette for arranging and loading reagent containers into a staining apparatus includes a housing with a base and walls upstanding from the base to define a plurality of compartments. Each compartment is configured for receiving a reagent container. The housing includes two portions, pivotably coupled together at respective first ends thereof, and configured to pivot between an open configuration and a closed configuration. Each portion of the housing in the closed configuration is received within a corresponding one (Continued)

of an adjacent pair of channels located within the staining apparatus when the cassette is loaded therewithin.

20 Claims, 15 Drawing Sheets

(51) Int. Cl.
*G01N 35/00* (2006.01)
*G01N 35/10* (2006.01)

(52) U.S. Cl.
CPC ... *G01N 35/00732* (2013.01); *G01N 35/1002* (2013.01); *B01L 2200/14* (2013.01); *B01L 2200/16* (2013.01); *B01L 2300/123* (2013.01)

(58) Field of Classification Search
CPC ... B01L 2200/16; B01L 2300/123; A61J 1/00; G01N 33/4875; G01N 35/1002; G01N 1/312; G01N 35/00732; G01N 35/10; G01N 35/00584; G01N 35/00722
See application file for complete search history.

(56) References Cited

U.S. PATENT DOCUMENTS

| | | | |
|---|---|---|---|
| 8,388,913 B2 | 3/2013 | Sattler | |
| 8,926,921 B2 | 1/2015 | Rousseau et al. | |
| 2005/0142040 A1 | 6/2005 | Hanawa et al. | |
| 2008/0192567 A1* | 8/2008 | Vincent | B01F 29/321 366/198 |
| 2010/0034700 A1 | 2/2010 | Rousseau et al. | |
| 2010/0233036 A1* | 9/2010 | Sattler | G01N 35/026 422/509 |
| 2011/0152129 A1* | 6/2011 | Blouin | B65D 21/0204 506/40 |
| 2011/0244557 A1 | 10/2011 | Hamada | |
| 2013/0073941 A1* | 3/2013 | Evans | G06F 40/177 715/273 |
| 2013/0183213 A1* | 7/2013 | Croisard | B01L 3/50855 29/428 |
| 2014/0073517 A1 | 3/2014 | Zhou et al. | |
| 2016/0024748 A1 | 1/2016 | Ito | |
| 2016/0139010 A1 | 5/2016 | Heras et al. | |
| 2016/0238625 A1 | 8/2016 | Raicu et al. | |
| 2016/0263576 A1 | 9/2016 | Sattler et al. | |
| 2017/0328820 A1 | 11/2017 | Angros et al. | |
| 2018/0100186 A1 | 4/2018 | Yu et al. | |
| 2018/0149562 A1 | 5/2018 | Kawano | |

FOREIGN PATENT DOCUMENTS

| | | |
|---|---|---|
| CN | 105637368 A | 6/2016 |
| EP | 3 055 698 A1 | 8/2016 |
| JP | 6-76863 U | 10/1994 |
| JP | 8-58792 A | 3/1996 |
| JP | 11-123335 A | 5/1999 |
| JP | 2010-91469 A | 4/2010 |
| JP | 2011-510263 A | 3/2011 |
| WO | 2009/040082 A1 | 4/2009 |
| WO | 2015/054113 A1 | 4/2015 |
| WO | 2017/218882 A1 | 12/2017 |
| WO | 2018/181646 A1 | 10/2018 |

OTHER PUBLICATIONS

International Search Report for PCT/AU2019/051375 dated Feb. 7, 2020 [PCT/ISA/210].
Written Opinion for PCT/AU2019/051375 dated Feb. 7, 2020 [PCT/ISA/237].
Communication dated Sep. 5, 2023 issued by the Intellectual Property India Patent Office in application No. 202117013053.
Communication dated Aug. 29, 2023 issued by the Japanese Patent Office in application No. 2021-516664.
Office Action issued Feb. 1, 2024 in Chinese Application No. 201980063443.6.

* cited by examiner

REAGENT CASSETTE

CROSS REFERENCE TO RELATED APPLICATIONS

This application is a National Stage of International Application No. PCT/AU2019/051375 filed Dec. 13, 2019, claiming priority based on Australian Patent Application No. 2018904754 filed Dec. 14, 2018.

TECHNICAL FIELD

The present invention relates to a cassette, and more particularly, to a reagent cassette for arranging and loading reagents onto an automated staining apparatus for treating tissue samples disposed on slides.

BACKGROUND OF INVENTION

Instrumentation for automated treatment of biological samples, such as anatomical pathology samples, is well known. Treatment may comprise staining procedures of the kinds that are typical in immunochemistry, in-situ hybridisation, special staining and cytology. Automation of some staining procedures has increased the speed with which pathology testing can be completed leading to earlier diagnosis and in some cases, intervention. Staining is typically performed on samples placed on microscopy slides to highlight certain histological features in a biological sample and incubation of the sample with small volumes of reagent is often performed. In many cases, automated staining of samples involves manipulation of robotic arms to deliver an aliquot of reagent to achieve staining.

In an example of an existing automated staining apparatus in use, tissue samples are placed on slides and moved to slide treatment modules of the apparatus to be treated using reagents. The treatment of the samples here is performed automatically by one or more robots configured to dispense reagents to the samples on the slides in a predetermined sequence according to a staining protocol.

Increased throughput of samples on slides through the automated staining apparatus is desirable but is often hindered by a number of factors. For instance, in the case of the reagent cassette, operator error often leads to an insufficient or incorrect number of reagent containers being loaded into the cassette, or indeed, reagent containers being loaded into the reagent cassette in the wrong position or in the wrong orientation, rendering it impossible for the staining apparatus to correctly identify the reagent container(s). Moreover, these errors may be compounded when more than one reagent cassette is required to be loaded into the staining apparatus.

The present invention seeks to provide a reagent cassette, which will overcome or substantially ameliorate at least some of the deficiencies of the prior art, or to at least provide an alternative.

A reference herein to a patent document or other matter which is given as prior art is not to be taken as an admission that the document or matter was known or that the information it contains was part of the common general knowledge as at the priority date of any of the claims.

SUMMARY OF INVENTION

According to a first aspect of the present invention there is provided a cassette for arranging and loading reagent containers into a staining apparatus, the cassette including: a housing with a base and walls upstanding from the base to define a plurality of compartments, each compartment being configured for receiving a reagent container, wherein, the housing includes two portions, pivotably coupled together at respective first ends thereof, and configured to pivot between an open configuration and a closed configuration, and wherein, each portion of the housing in the closed configuration is receivable within a corresponding one of an adjacent pair of channels located within the staining apparatus when the cassette is loaded therewithin.

Preferably, each portion of the housing includes at the location of each compartment, an aperture extending substantially through a wall thereof to at least partially receive a corresponding protrusion of a reagent container received within the compartment to ensure that the reagent container is correctly placed within the compartment.

Preferably, the wall of each housing portion is a side wall, and wherein only the apertures associated with one of the two housing portions are externally facing when the housing is in the closed configuration.

Preferably, each reagent container includes a lid pivotably coupled to a wall of the reagent container, and the cassette is configured such that only when the housing is in the open configuration can the lids of those reagent containers received within the compartments associated with both of the two housing portions be opened.

Preferably, the cassette further includes locking means to lock the two housing portions in position when the housing is in the closed configuration.

Preferably, the locking means is located at respective second ends of each of the two housing portions.

In one embodiment, the locking means takes the form of a snap-fit arrangement, in which the second end of one housing portion includes a cantilever hook and the second end of the other housing portion includes a complementary recess configured to receive the cantilever hook when the housing is in the closed configuration.

Preferably, when the housing is in the closed configuration, the two housing portions are spaced apart from each other by a predetermined distance that corresponds to the spacing between the adjacent pair of channels located within the staining apparatus.

Preferably, the base extends outwardly from opposing lateral side walls of the housing to define a pair of flanges such that when the housing is in the closed configuration, the flanges of each portion of the housing can be slidingly received by a corresponding pair of laterally opposing alignment guides associated with each of the adjacent pair of channels located within the staining apparatus when the cassette is loaded substantially therewithin.

Preferably, at least one of the two housing portions includes a recess configured to receive a spring-biased detent pin, the movement of which is actuated by of a solenoid lock associated with the staining apparatus, to lock the cassette substantially in place within the staining apparatus when the cassette is loaded substantially therewithin.

Preferably, the recess is located at the first end of the at least one housing portion.

Preferably, the recess extends through a portion of the base associated with the at least one housing portion.

Preferably, the cassette further includes a handle to facilitate loading and unloading of the cassette into and out of the staining apparatus.

Preferably, the handle is located at a second end of the housing portion that includes the recess located at the first end thereof.

In one embodiment, the handle includes a display panel for displaying an identifier associated with the identity of the plurality of reagent containers loaded within the compartments thereof.

Preferably, the cassette further includes locking means to lock the two housing portions in position when the housing is in the open configuration.

Preferably, the locking means is located at respective first ends of each of the two housing portions.

In one embodiment, the locking means takes the form of a snap-fit arrangement, in which the first end of one housing portion includes a cantilever hook and the first end of the other housing portion includes a complementary lip configured to engage the cantilever hook when the housing is in the open configuration.

Preferably, each channel of an adjacent pair of channels located within the staining apparatus includes a sensor configured to determine the presence of a corresponding one of the two housing portions when the cassette is loaded into the staining apparatus with the housing in the closed configuration.

Preferably, when the cassette is loaded into the staining apparatus, each compartment of the housing is positioned at a predetermined location within the staining apparatus, such that a probe associated with the staining apparatus can be inserted through an opening of the reagent container received within each compartment with positional accuracy to withdraw a reagent therefrom.

Preferably, the housing is manufactured from an engineering polymer selected from the group including acrylonitrile butadiene styrene (ABS), polypropylene (PP), high density polyethylene (HDPE), polycarbonate (PC), polyvinyl chloride (PVC) and polytetrafluoroethylene (PTFE).

In one embodiment, the housing is manufactured from stainless steel.

Preferably, the walls defining each of the plurality of compartments include at least one rib to provide a frictional fitting with the reagent container when the reagent container is received therein.

Preferably, the base includes a draining aperture at the location of each of the plurality of compartments.

Other aspects of the invention are also disclosed.

BRIEF DESCRIPTION OF DRAWINGS

Notwithstanding any other forms which may fall within the scope of the present invention, preferred embodiments of the invention will now be described, by way of example only, with reference to the accompanying drawings in which.

DETAILED DESCRIPTION

It is to be understood that the following description is for the purpose of describing particular embodiments only and is not intended to be limiting with respect to the above description.

Figure 14:
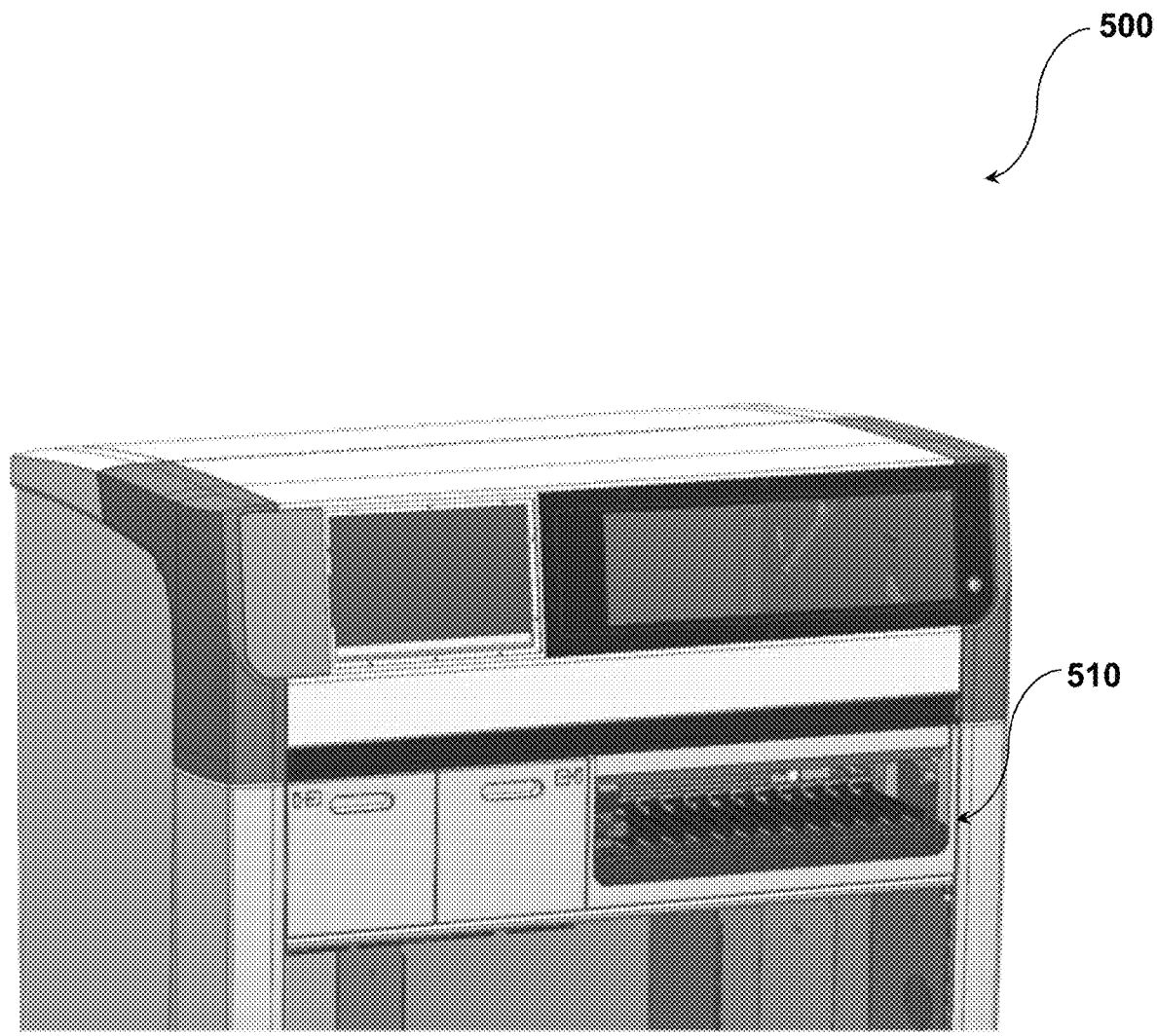
FIG. 14 shows a perspective view of an automated staining apparatus for receiving one or more reagent cassettes of FIG. 1.

The present invention is predicated on the finding of a reagent cassette 10 for arranging and loading reagent containers into a staining apparatus such as that shown in FIG. 14, in which the reagent cassette 10 includes two individual reagent cassettes pivotably joined together at a first end thereof and configured to occupy an adjacent pair of channels 510 associated with the staining apparatus 500 that would ordinarily be used to receive two individual reagent cassettes.

By virtue of this arrangement, it becomes possible to provide a reagent cassette 10 that includes more than the standard number of compartments associated with an individual reagent cassette, such that any reagent containers provided as part of a kit such as a detection kit, can be packaged and sold together as a single item. In this respect, the various reagents associated with the kit can be preloaded into predetermined compartments within a housing of the reagent cassette 10, thereby making it easier for an automated staining apparatus 500 to recognise that the right number of reagent containers have been loaded into the apparatus 500 in the right order.

The kit form of the reagent cassette can also be used to provide registered and/or validated reagent for use by customers (e.g., U.S. Food & Drug Administration (FDA)) to provide a regulatory validated system.

As an example, the staining apparatus 500 shown in FIG. 14 may take the form of the BOND-III Fully Automated IHC and ISH Stainer from Leica Biosystems™, and the reagent containers may include the DS9800 Bond Polymer Refine Detection Kit, the DS9390 Bond Polymer Refine Red Detection Kit, or the DS9477 ChromoPlex 1 Dual Detection for Bond Kit.

What follows is a detailed description of a reagent cassette 10 according to a preferred embodiment of the present invention, which is configured for arranging and loading reagent containers into an adjacent pair of channels 510 associated with the staining apparatus 500 shown in FIG. 14.

Housing

As shown in FIGS. 1 to 10, the reagent cassette 10 includes a housing that takes the form of two portions 100, 200 pivotably coupled together at their respective first ends by way of a hinge mechanism. The two housing portions 100, 200 are ideally manufactured from a material that is resistant to the chemicals associated with slide staining equipment.

For instance, in one embodiment, the two housing portions 100, 200 are manufactured from an engineering polymer using a suitable manufacturing process such as injection moulding.

Preferred engineering polymers are selected from the group including acrylonitrile butadiene styrene (ABS), high density polypropylene (HDPP), high density polyethylene (HDPE), polycarbonate (PC), polyvinyl chloride (PVC) and polytetrafluoroethylene (PTFE).

The first housing portion 100 includes a base 110, a pair of side walls 120, 130, a pair of end walls 140, 150, and a plurality of partition walls 160, 165, 170, 175, all upstanding from the base 110 to define a plurality of compartments (given the general reference numeral Xa-Xe). Each compartment Xa-Xe is configured for receiving a reagent container, such as the reagent containers loaded into the compartments Xa-Xe shown in FIG. 15. The two lateral side walls 120, 130 each have a corresponding lip 125, 135 that extends outwardly from an upper portion of the corresponding side wall 120, 130 at a generally 90 degree angle with respect to the side wall 120, 130.

As shown in FIGS. 1 to 6 and 8, a series of numbers "1, 2, 3, 4 and 5" is marked on an upper surface of each lip 125, 135 at the location of a corresponding one of the plurality of compartments Xa-Xe of the first housing portion 100 for use as visual identifiers for the reagent container that may be loaded into each compartment Xa-Xe.

To ensure that a frictional fitting occurs with respect to a reagent container when it is received within the compartment Xa-Xe, one or more of the side walls 120, 130, the end walls 140, 150, and the partition walls 160, 165, 170, 175 defining the plurality of compartments Xa-Xe includes at least one rib that protrudes inwardly with respect to the compartment Xa-Xe so as to engage snugly with a corresponding wall of the reagent container.

Figure 15:
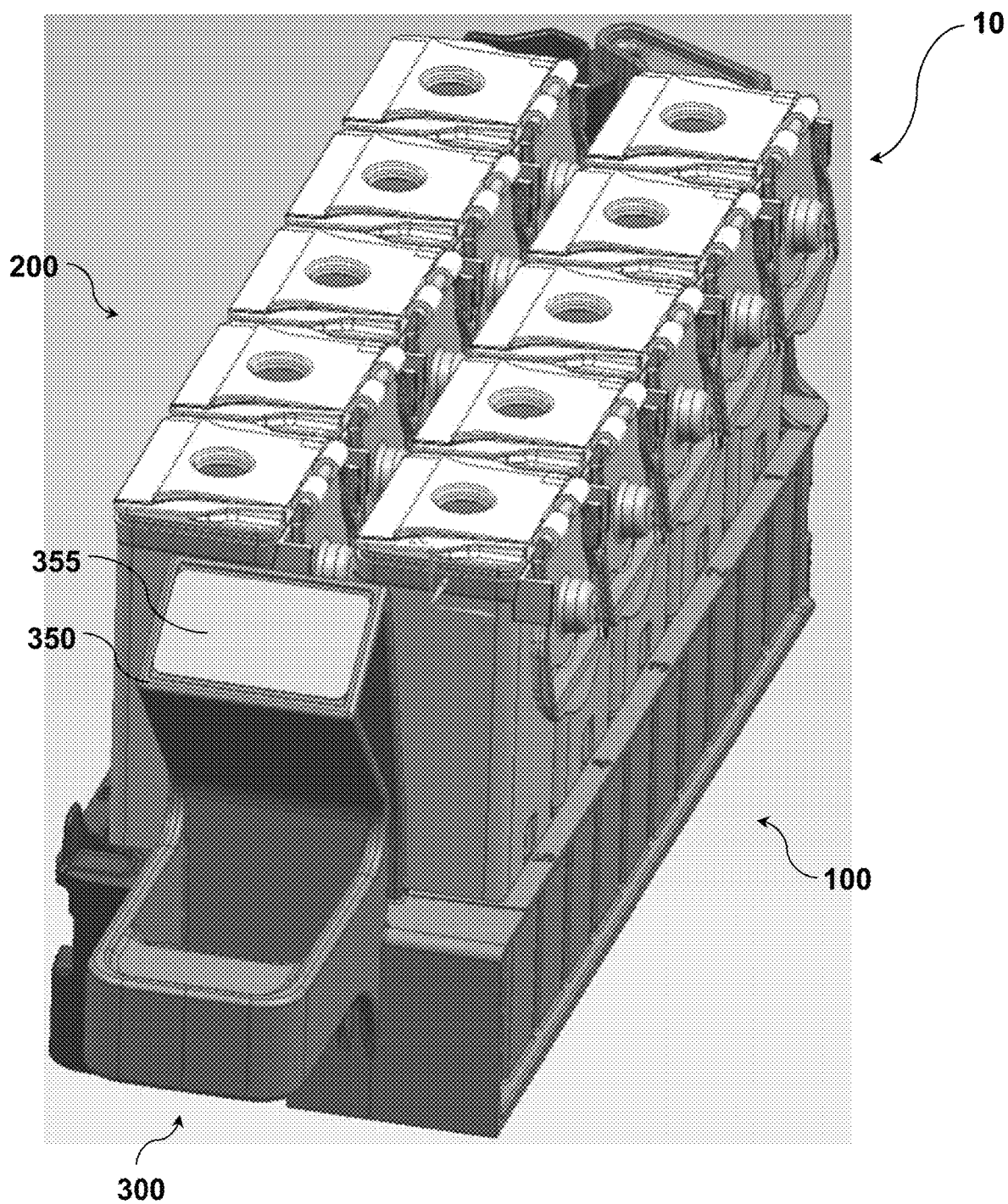
FIG. 15 shows a perspective view of the reagent cassette of FIG. 1 including a plurality of reagent containers loaded into a corresponding one of a plurality of compartments of the reagent cassette.

While the second housing portion 200 includes a base 210, a pair of side walls 220, 230, a pair of end walls 240, 250, and a plurality of partition walls 260, 265, 270, 275, all upstanding from the base 210 to define a plurality of compartments (given the general reference numeral Xf-Xj), wherein each compartment Xf-Xj is configured for receiving a reagent container, such as the reagent containers loaded into the compartments Xf-Xj shown in FIG. 15. The two lateral side walls 220, 230 each have a corresponding lip 225, 235 that extends outwardly from an upper portion of the corresponding side wall 220, 230 at a generally 90 degree angle with respect to the side wall 220, 230

As shown in FIGS. 1 to 6 and 8, a series of numbers "6, 7, 8, 9 and 10" is marked on an upper surface of each lip 225, 235 at the location of a corresponding one of the plurality of compartments Xf-Xj for use as visual identifiers for the reagent container that may be loaded into each compartment Xf-Xj.

Again, to ensure that a frictional fitting occurs with respect to a reagent container when it is received within the compartment Xf-Xj, one or more of the side walls 220, 230, the end walls 240, 250, and the partition walls 260, 265, 270, 275 defining the plurality of compartments Xf-Xj includes at least one rib that protrudes inwardly with respect to the compartment Xf-Xj so as to engage snugly with a corresponding side wall of the reagent container.

Figure 1:
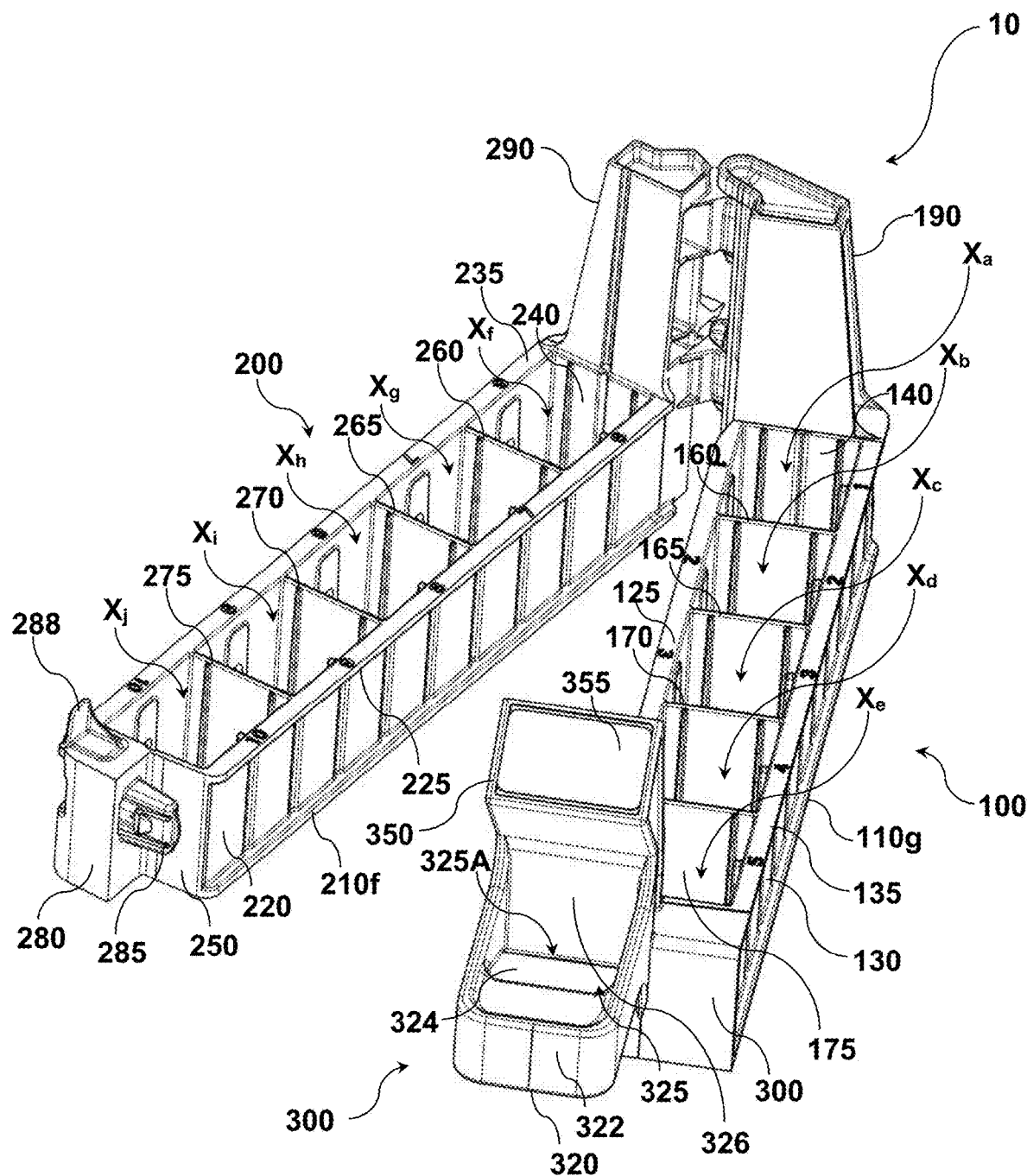
FIG. 1 shows a perspective view of a reagent cassette according to a preferred embodiment of the present invention, in which the reagent cassette is shown in a partially open configuration when viewed from the front.

As shown in, for example, FIG. 1, the second housing portion 200 includes a generally rectangular portion 280 that extends outwardly from the end wall 250. The portion 280 is generally about half the width of the second housing portion 200 and is located close to the side wall 230 of the second housing portion 200.

Extending outwardly from what would be considered an inwardly facing surface of the portion 280 when the housing is in the closed position is a protrusion with a cantilever hook 285 mounted to one side of the protrusion.

As will be described in more detail below, the cantilever hook 285 forms part of a locking mechanism to lock the two housing portions 100, 200 together when the housing is in the closed configuration.

In addition, and as shown in FIGS. 2, 4 to 6 and 10, the side wall 130 of the first housing portion 100 and the side wall 230 of the second housing portion 200 both include generally circular apertures (given the general reference numeral Aa-Aj) that extend substantially through the side walls 130, 230 at the location of a corresponding one of the plurality of compartments Xa-Xj.

Figure 3:
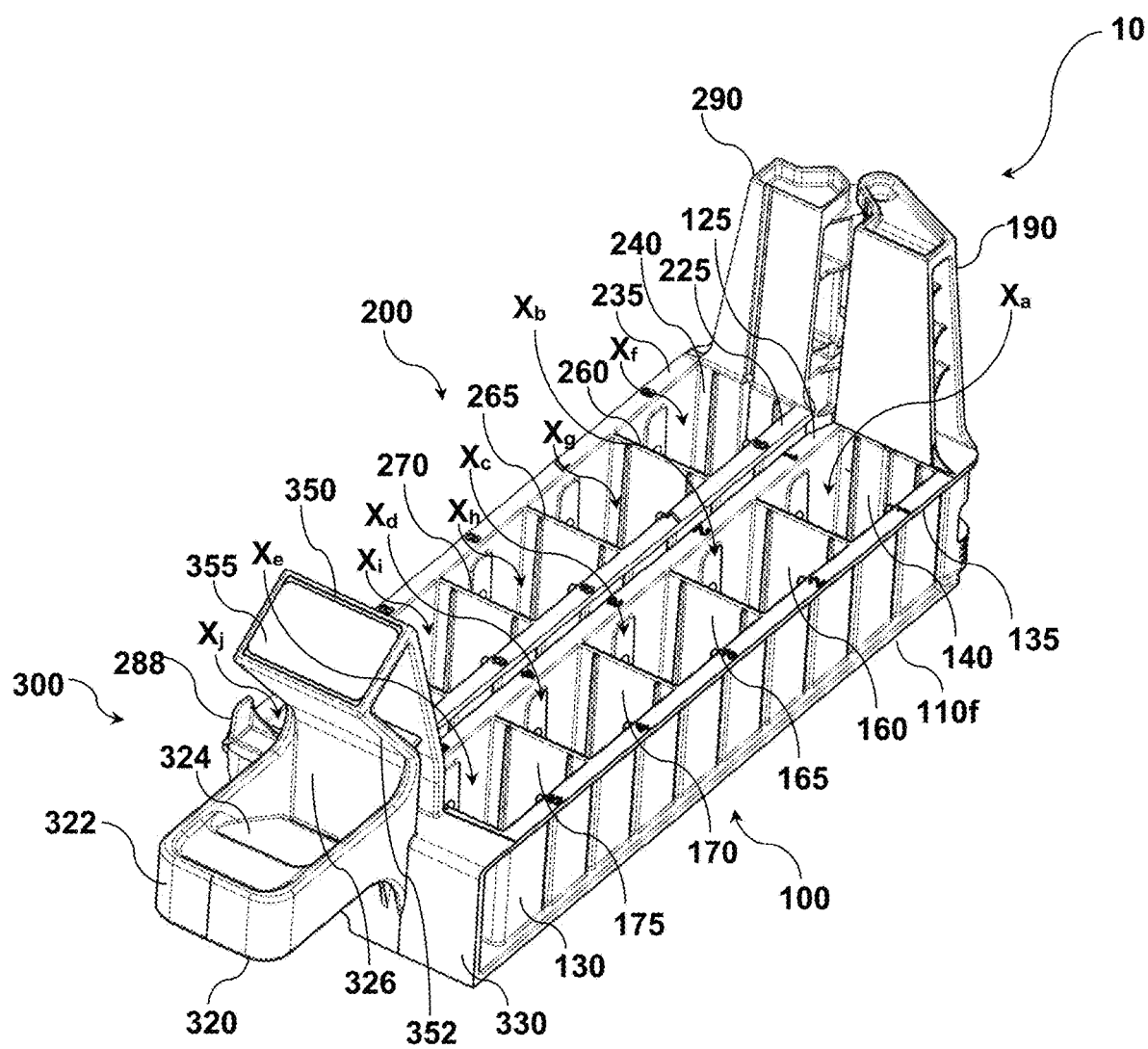
FIG. 3 shows a perspective view of the reagent cassette of FIG. 1 in a closed configuration, when viewed from the front.
Figure 5:
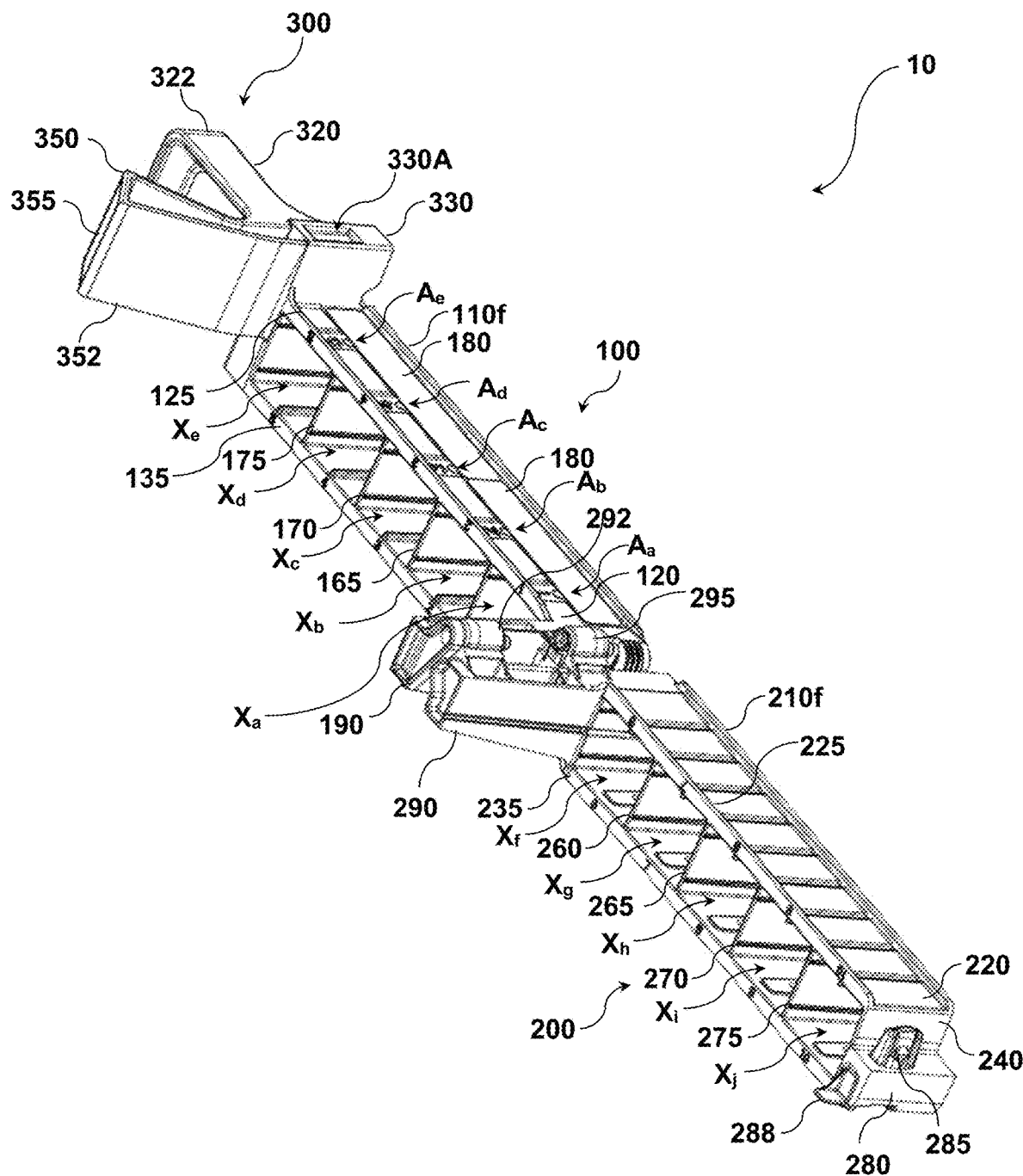
FIG. 5 shows a perspective view of the reagent cassette of FIG. 1, in which the reagent cassette is shown in an open configuration when viewed from the front.

For instance, and as shown in FIGS. 1, 3 and 5, these generally circular apertures Aa-Ae extending through the side wall 130 of the first housing portion 100 are each positioned to at least partially receive a corresponding protrusion, projection or ball (not shown) extending outwardly from one of the side walls of a reagent container that has been loaded into the corresponding compartment Xa-Xe. The protrusion provides a tactile indicator for an operator to indicate that the reagent container is properly oriented within the compartment Xa-Xe. A series of numbers "1, 2, 3, 4 and 5" is marked on an external surface of the side wall 130 above the location of a corresponding one of the apertures Aa-Ae for use as visual identifiers for the reagent container that may be loaded into each compartment Xa-Xe.

By the same token, located beneath each of these generally circular apertures Aa-Ae is a generally rectangular shaped aperture (not shown) that is again, positioned to at least partially receive a corresponding protrusion (not shown) extending outwardly from the same side wall of the reagent container loaded into that compartment Xa-Xe. As shown in FIG. 5, the rectangular shaped apertures extending through the side wall 130 of the first housing portion 100 are hidden from view by virtue of panels 180, which may be used, for example, for labelling and/or identification purposes.

Figure 2:
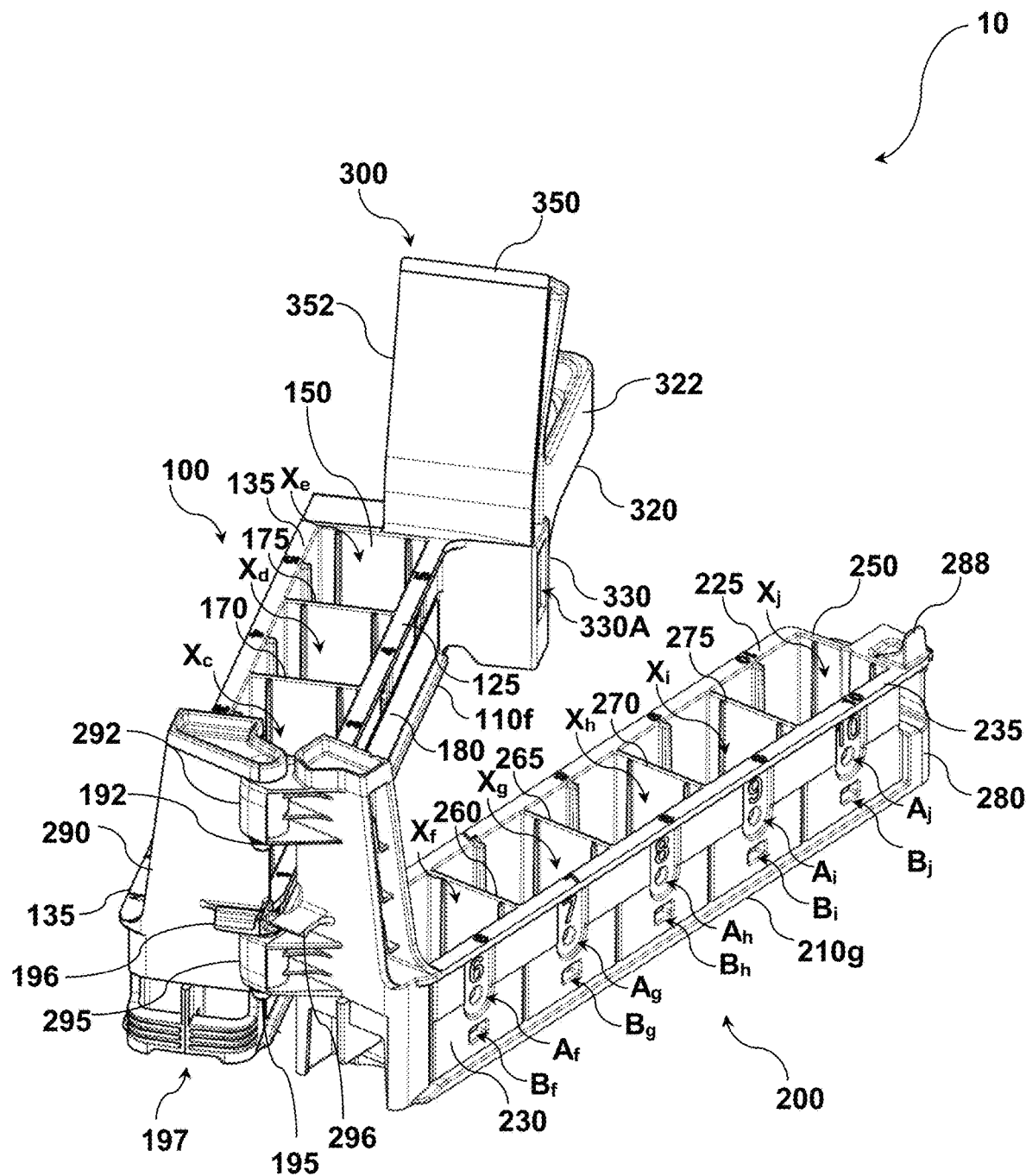
FIG. 2 shows a perspective view of the reagent cassette of FIG. 1, when viewed from the rear.
Figure 4:
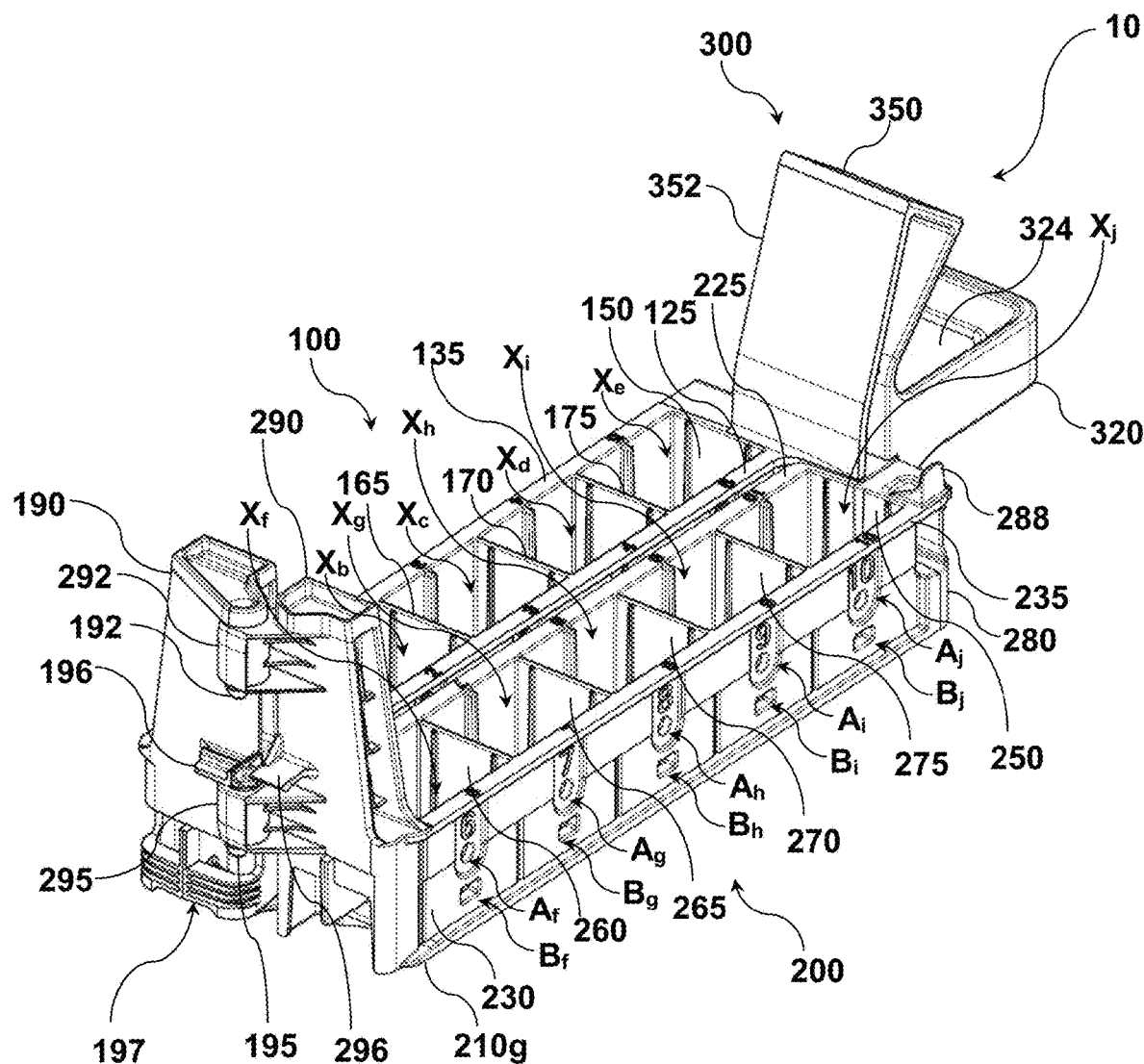
FIG. 4 shows a perspective view of the reagent cassette of FIG. 3 in the closed configuration, when viewed from the rear.
Figure 6:
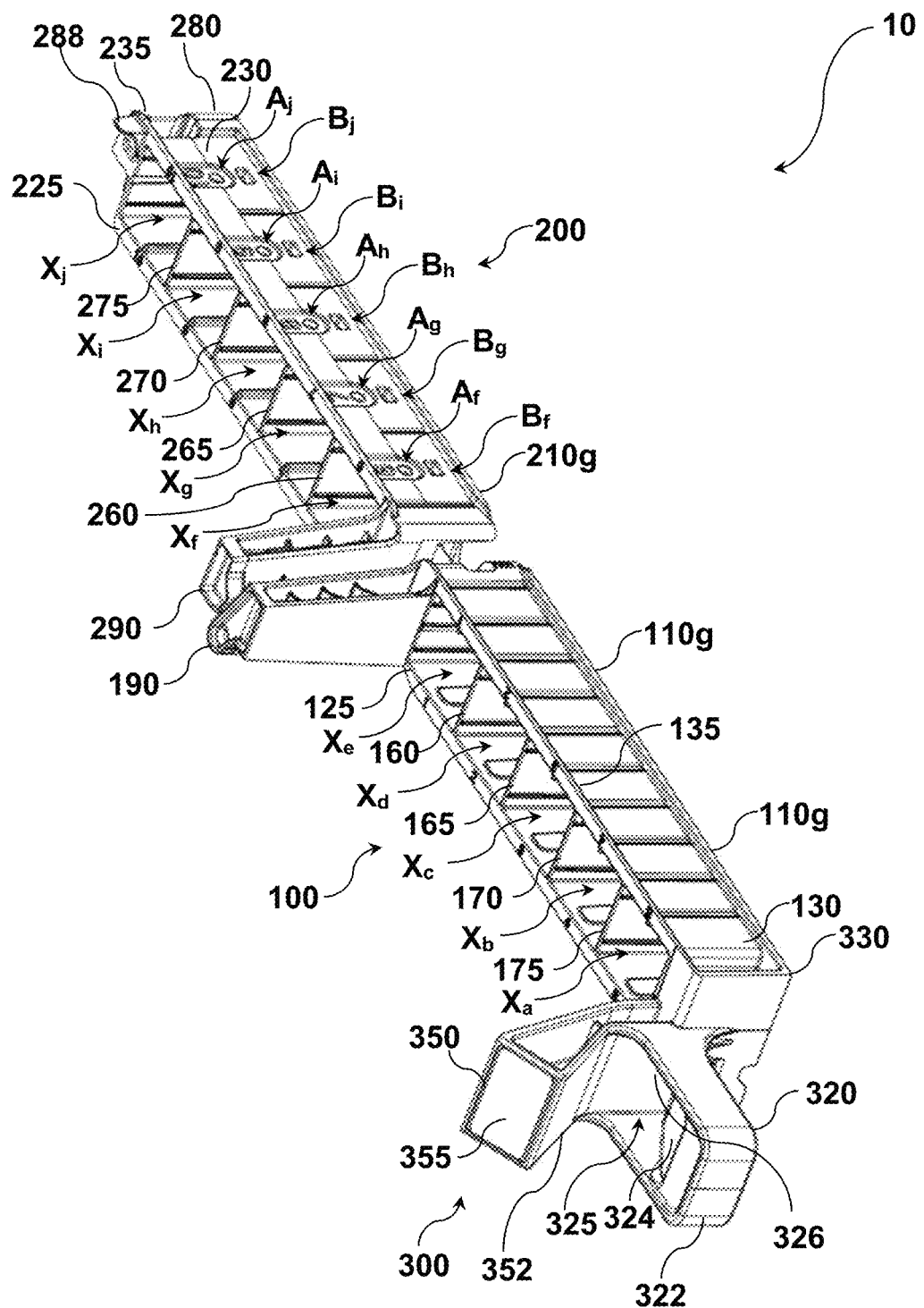
FIG. 6 shows a perspective view of the reagent cassette of FIG. 1, in which the reagent cassette is shown in an open configuration when viewed from the rear.

Similarly, and as shown in FIGS. 2, 4 and 6, these generally circular apertures Af-Aj extending through the side wall 230 of the second housing portion 200 are each positioned to at least partially receive a corresponding protrusion, projection or ball (not shown) extending outwardly from one of the side walls of a reagent container that has been loaded into the corresponding compartment Xf-Xj. The protrusion provides a tactile indicator for an operator to indicate that the reagent container is properly oriented within the compartment Xi-Xj. Again, a series of numbers "6, 7, 8, 9 and 10" is marked on an external surface of the side wall 230 above the location of a corresponding one of the apertures Af-Aj for use as visual identifiers for the reagent container that may be loaded into each compartment Xf-Xj.

While the generally rectangular shaped apertures Bf-Bj are positioned to at least partially receive, and may optionally lock the container in place, a corresponding protrusion (not shown) may extend outwardly from the same side wall of the reagent container loaded into that compartment Xf-Xj.

This arrangement ensures that each reagent container is correctly placed (that is, oriented) within a corresponding compartment Xa-Xj of the first and second housing portions 100, 200. This is important as when the reagent cassette 10 is loaded into the staining apparatus 500, each compartment Xa-Xj is positioned at a predetermined location within the staining apparatus 500, such that a probe (not shown) associated with the staining apparatus 500 can be controlled by software to locate an opening of a particular reagent container received within one of the compartments Xa-Xj with positional accuracy, where the software-controlled probe can then enter through the opening to withdraw a reagent from the reagent container. Indeed, if the opening at the top of the reagent container is not centrally disposed, then an incorrectly oriented reagent container may mean that the opening is not located at the specific coordinates that the software is programmed to cause the probe to move to.

As shown in FIGS. 3 and 4, only the generally circular apertures Af-Aj and generally rectangular shaped apertures Bf-Bj associated with the second housing portion 200 are externally facing when the housing is in the closed configuration.

Drainage Apertures

Figure 7:
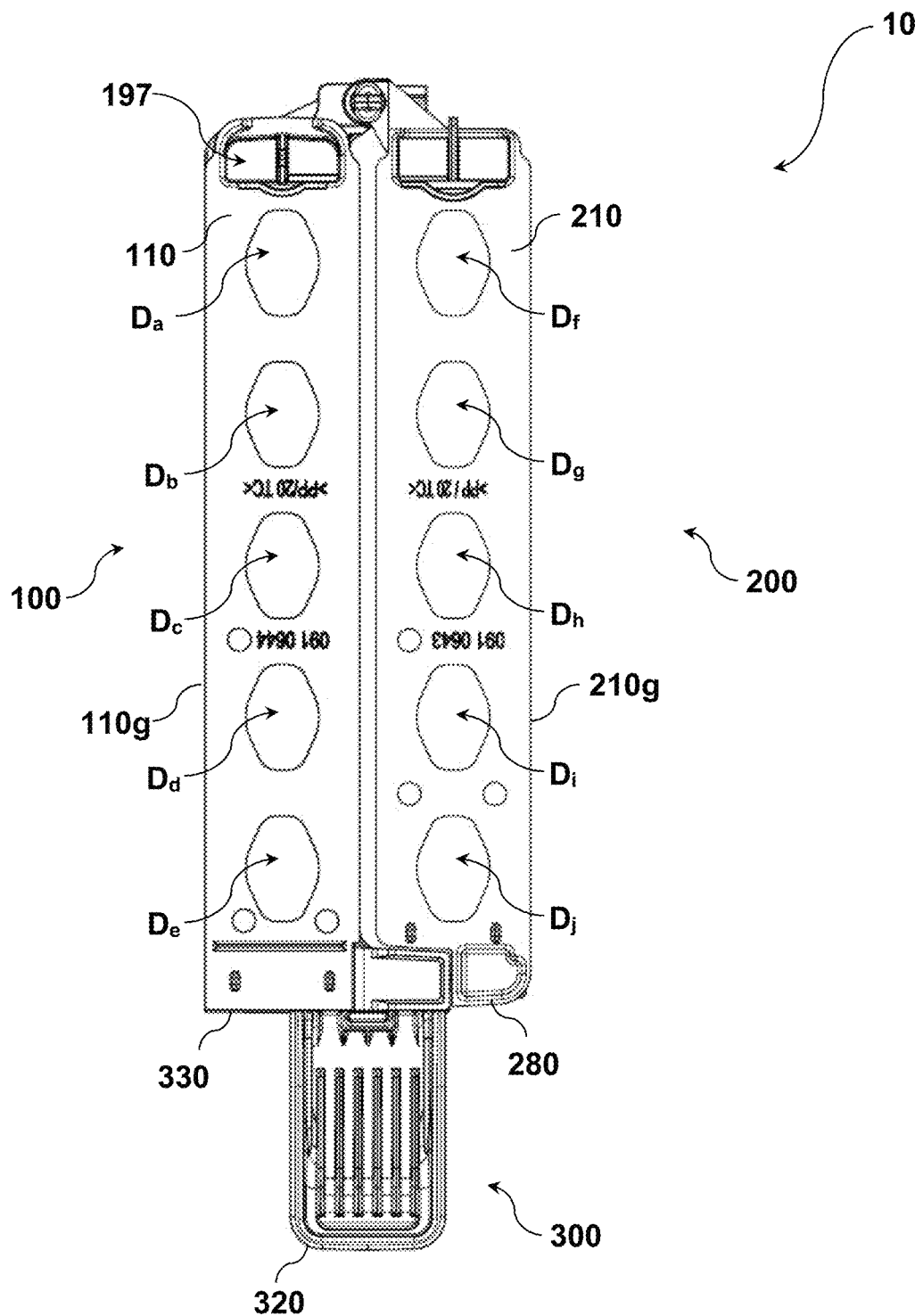
FIG. 7 shows a bottom view of the reagent cassette of FIG. 1 in a closed configuration.
Figure 8:
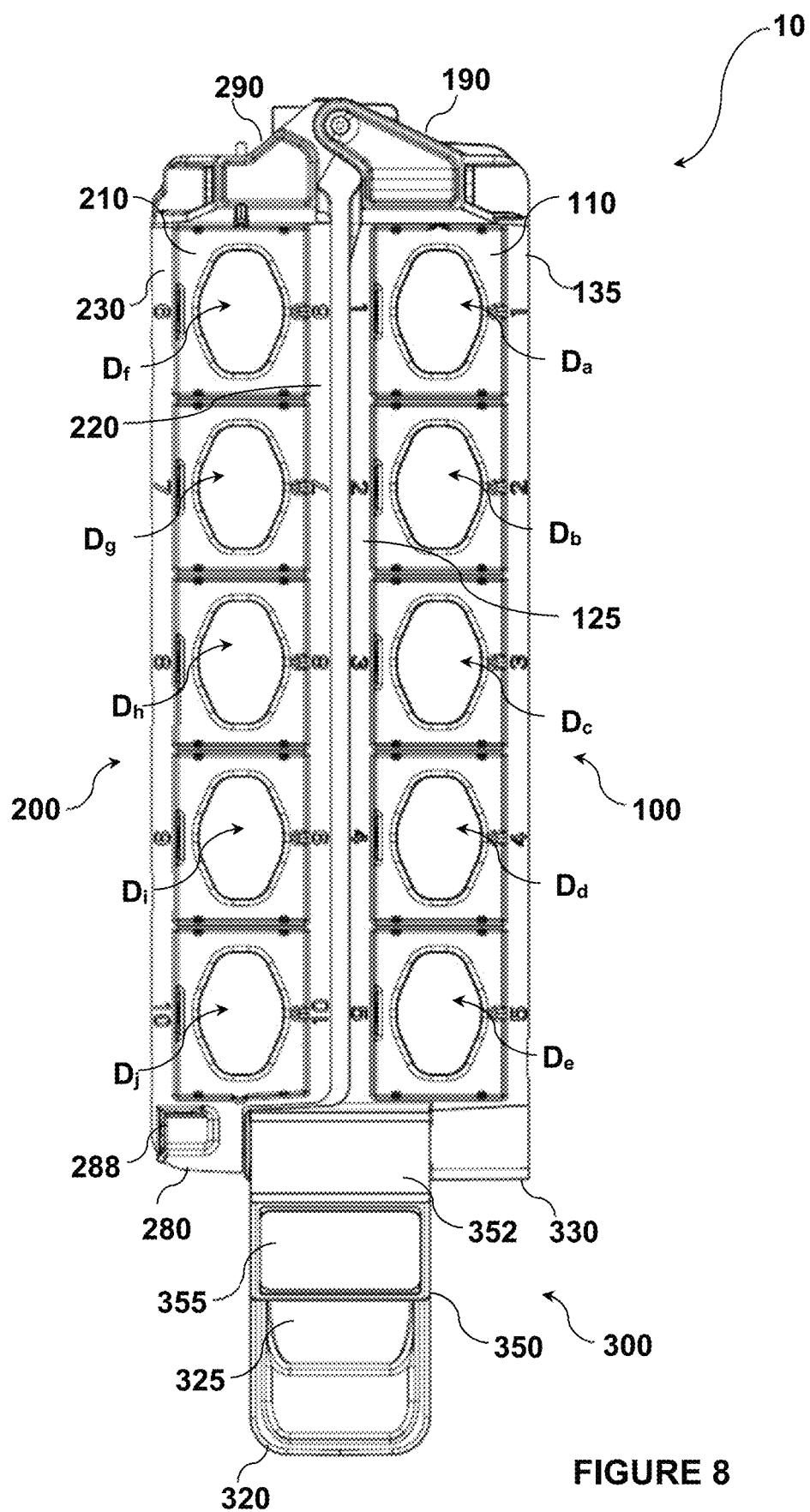
FIG. 8 shows (a plan view of the reagent cassette of FIG. 1 in a closed configuration.
Figure 9:
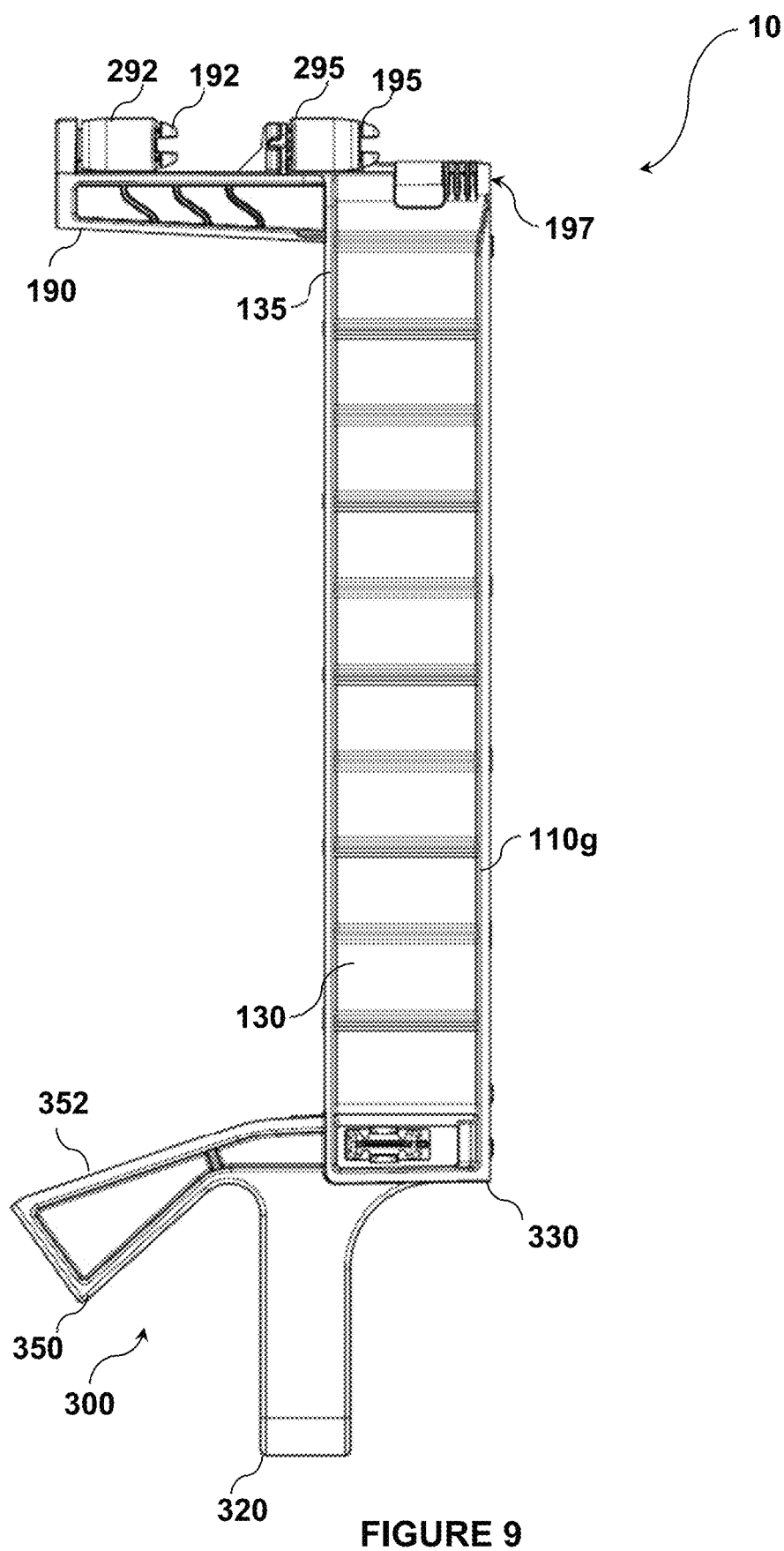
FIG. 9 shows a side view of the reagent cassette of FIG. 1 in a closed configuration.
Figure 10:
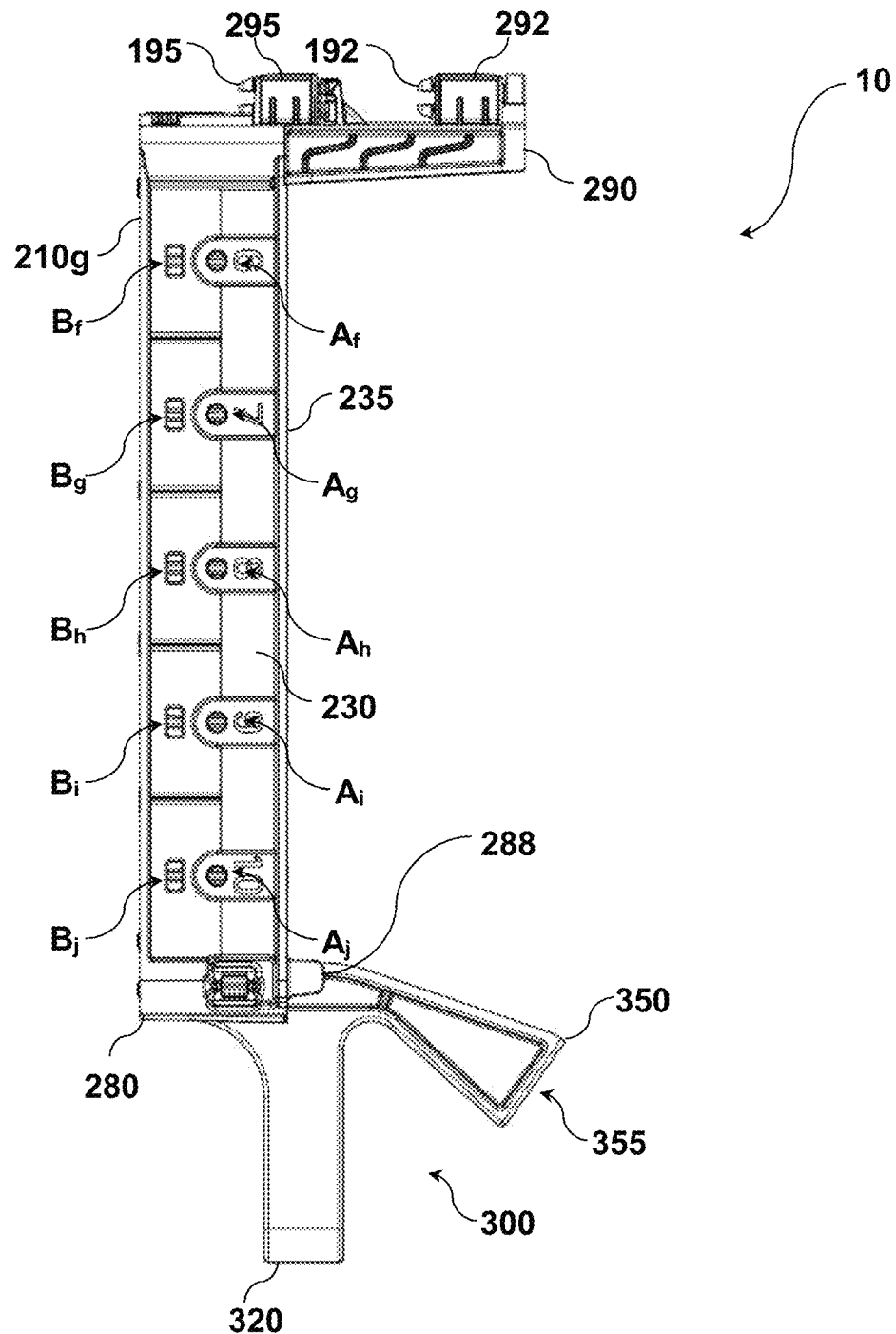
FIG. 10 shows a side view of the reagent cassette of FIG. 1 in a closed configuration.

As shown in FIGS. 7 and 8, the bases 110, 210 for the first and second housing portions 100, 200 each includes a plurality of drainage apertures (given the general reference numeral Da-Dj), with an aperture Da-Dj at the location of each of the plurality of compartments Xa-Xj.

Flanges

As shown in, for example, FIGS. 1 to 6, the bases 110, 210 for the first and second housing portions 100, 200 both extend outwardly from opposing lateral side walls 120, 130 and 220, 230 of the corresponding housing portion 100, 200 to define a pair of laterally opposing flanges 110f, 110g and 210f, 210g such that when the housing is in the closed configuration, the flanges 110f, 110g and 210f, 210g of each portion 100, 200 of the housing can be slidingly received by a corresponding pair of laterally opposing alignment guides (not shown) associated with each of the adjacent pair of channels 510 located within the staining apparatus 500 when the reagent cassette 10 is loaded substantially therewithin.

Handle

The reagent cassette 10 also includes a handle 300 for use in facilitating the loading and unloading of the reagent cassette 10 into and out of the adjacent pair of channels 510 of the staining apparatus 500.

It will be appreciated by persons of ordinary skill in the relevant art that the handle 300 may take any form.

In one embodiment, and as shown in FIGS. 1 to 10, the handle 300 takes the form of a generally rectangular shaped body 320 having a central cavity 325, as defined by a wall 322 of the body 320, a downwardly sloping surface 324 and a generally vertical rear surface 326, where the two surfaces 324, 326 converge to define an opening 325A to allow any fluid captured within the cavity 325 to drain away.

Disposed between the handle 300 and the end wall 150 of the first housing portion 100 is a generally rectangular shaped hollow body portion 330 that is oriented generally orthogonally with respect to the longitudinal axis of the first housing portion 100, with, as shown in FIGS. 2 and 5, around a 30-50% portion of the body portion 330 extending beyond the side wall 120 toward what can be considered an inwardly facing side of the first housing portion 100 when the housing is in the closed configuration. And, as shown in FIG. 7, the size of the body portion 330 is complementary to the smaller size of the portion 280 located at the second end of the second housing portion 200

As will be described in more detail below, and as shown in FIGS. 2 and 5, the body portion 330 also includes a recess 330A that extends at least partially through, what would be considered an inwardly facing end of the body portion 330 when the housing is in the closed configuration. The recess 330A is configured internally with a lip (not shown) that is complementary to the cantilever hook 285 extending outwardly from the inwardly facing surface of the portion 280, whereby both the recess and the cantilever hook 285 constitute complementary parts of the same locking mechanism, as described in more detail below.

The handle 300 extends outwardly from the around 30-50% portion of the body portion 330. By virtue of this structure, when the housing is in the closed configuration, the handle 300 is positioned along a longitudinal axis that extends generally midway between the compartments Xa-Xe of the first housing portion 100 and the compartments Xf-Xj of the second housing portion 200.

As shown in FIGS. 1 to 6, 9 and 10, the handle 300 includes a display panel 350 for use in displaying an identifier (not shown) associated with the identity of any reagent containers that have been preloaded into the plurality of compartments of the reagent cassette 10 in kit-form.

Further identifiers may also be provided or be located in association with the reagent cassette 10, such as labels including any form of barcode, QR code or other identifiers, such as an RFID reader or any such read and/or write device that may provide for the identification, machine or otherwise, of the reagent cassette 10 or reagent containers located therein. These identifiers may provide stock information to the apparatus 500 and may also be utilized for tracking, inventory management, quality assurance of reagents, expiry management, or the provision of other such information associated with the reagent cassette 100 both with and without reagent containers.

In the context of a reagent, the machine-readable code, encoding its unique consumable code, may be printed on a label that is applied to a portion of the reagent cassette 10, reagent container or printed directly onto an external surface of the reagent container and/or reagent cassette 10. The machine-readable code for a reagent may encode a lot number, reagent type, volume, and/or the like, and may be readable by an apparatus 500 during use (or the container may comprise two machine-readable codes, one of which can be scanned by a user device (not shown) and one of which can be scanned by the apparatus 500 during use).

In the context of a reagent kit, comprising a plurality of reagent containers, the machine-readable code, encoding the kit's unique consumable code, may be printed on a label that is applied to the kit carrier or printed directly on the kit carrier. The machine-readable code for the reagent kit may be based on the machine-readable codes for each of the reagent containers within the reagent kit. For example, the machine-readable code for the reagent kit may comprise an encoded combination of the information encoded in each of the machine-readable codes of the reagent containers within the reagent kit.

The display panel 350 is defined by an elongate sheet member 352 of generally the same width as the handle 300, that extends upwardly from the rear surface 326 of the handle 300 at a generally 45 degree angle relative to the orientation of the body 320 of the handle 300. The sheet member 352 is then essentially folded about 90 degrees back on itself to define a generally flat rectangular surface that forms the display surface 355 of the display panel 350. The sheet member 352 is then folded about 90 degrees again, before extending down to an upper surface of the generally rectangular body portion 330. The resulting display panel surface 355 may be used to affix or print a barcode, QR code, RFID tag or the like, for use in labelling the cassette 10 with for example, an identifier for a kit comprising a plurality of reagent containers loaded into the compartments Xa-Xj.

Hinge

It will be appreciated by persons of ordinary skill in the relevant art that the hinge mechanism may take any form.

For instance, in one embodiment, the hinge mechanism takes the form of a barrel type hinge arrangement.

Figure 11:
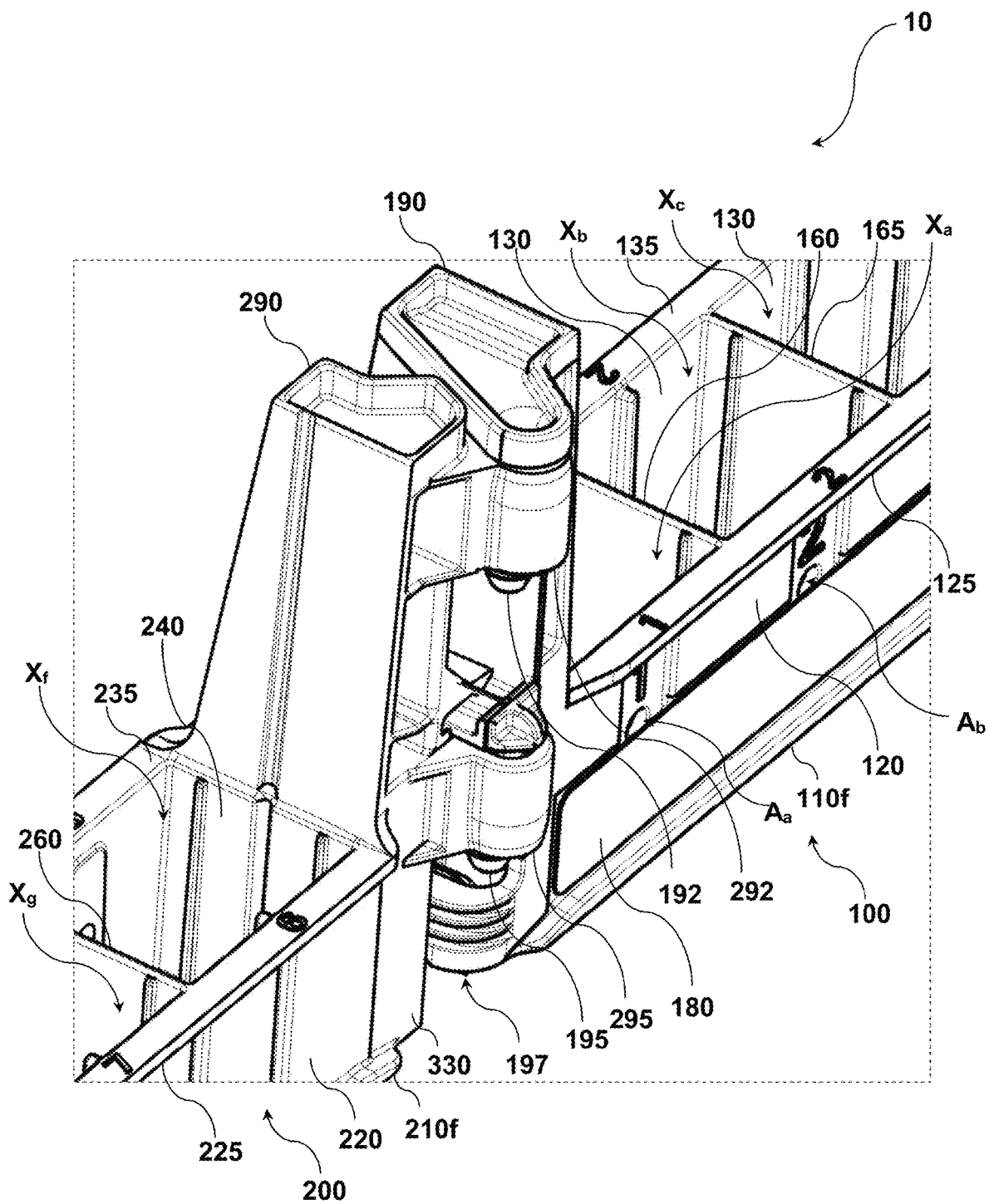
FIG. 11 shows a perspective view of a hinge portion of the reagent cassette of FIG. 1 in an open configuration.

In particular, and as shown in FIGS. 2, 4, 5, 9 and 10, and more closely in FIG. 11, the second housing portion 200 includes a generally triangular shaped hollow bracket 290 truncated at an upper portion thereof, which is formed at the first end of the second housing portion 200. The bracket 290 extends above the height of the two lips 225, 235 that extend outwardly from an upper portion of a corresponding one of the two lateral side walls 220, 230. Extending outwardly from what can be considered an inwardly pointing corner of the bracket 290 is a pair of spaced apart barrels 292, 295. The angle at which the barrels 292, 295 extend from the corner ensures that the barrels 292, 295 are positioned off-centre with respect to a longitudinal axis of the first housing portion 100.

The first housing portion 100 includes a similarly shaped bracket 190 truncated at an upper portion thereof, which is formed at the first end of the first housing portion 100, and which extends above the height of the two lips 125, 135 that extend laterally outwards from an upper portion of a corresponding one of the two lateral side walls 120, 130.

Extending outwardly from what can be considered an inwardly pointing corner of the bracket 190 is a pair of spaced apart and downwardly oriented snap lock pins 192, 195 with barbed head portions. The angle at which the snap lock pins 192, 195 extend from the corner ensures that the snap lock pins 192, 195 are positioned off-centre with respect to a longitudinal axis of the first housing portion 100.

The two snap lock pins 192, 195 are spaced apart from each other by a distance that is complementary to the spacing associated with the two barrels 292, 295. In this respect, the two housing portions 100, 200 can be operably coupled together by inserting the two snap lock pins 192, 195 of the first housing portion 100 through a corresponding barrel 292, 295 of the second housing portion 200 to form a pivotable arrangement at the respective first ends of the two housing portions 100, 200. Indeed, when the barbed head portion of the snap lock pin 192, 195 has passed through the corresponding barrel 292, 295, it expands to reduce the likelihood of the two housing portions 100, 200 becoming separated easily.

By virtue of this hinge arrangement, the housing is configured to pivot between an open configuration, in which the two housing portions 100, 200 are oriented at generally 180 degrees relative to each other (as shown in FIGS. 5 and 6) and a closed configuration, in which the two housing portions 100, 200 are positioned side by side (as shown in FIGS. 3 and 4). The housing is prevented from rotating to a position greater than 180 degrees by virtue of the positioning at which the barrels 292, 295 and the corresponding snap lock pins 192, 195 are both set.

Locking Means

The cassette 10 further includes locking means to lock the two housing portions 100, 200 in position in readiness for loading into an adjacent pair of channels 510 within the staining apparatus 500 when the housing is in the closed configuration.

In one embodiment, and as shown in FIGS. 1, 2 and 5, the locking means takes the form of a snap-fit arrangement between the cantilever hook 285 associated with the portion 280 located at the second end of the second housing portion 200, and the complementary lip (not shown) located within the recess 330A within the body portion 330.

In use, when the respective second ends of the two housing portions 100, 200 are brought together, the protrusion with the cantilever hook 285 extending from the inwardly facing surface of the small portion 280 enters the recess 330A within the body portion 330, where the internally located lip is configured to engage the cantilever hook 285 via the snap-fit arrangement to lock the two housing portions 100, 200 together when the housing is in the closed configuration.

As shown in FIGS. 7 and 8, the respective orientations of the barrels 292, 295 and the corresponding snap lock pins 192, 195 at the respective first ends of the two housing portions 100, 200, in combination with the about 30-50% outwardly extending portion of the body portion 330 located at the second end of the first housing portion 100 and the smaller portion 280 located at the second end of the second housing portion 200, ensures that when the housing is in the closed configuration, the two housing portions 100, 200 are sufficiently spaced apart from each other by a predetermined distance that corresponds to the spacing between the adjacent pair of channels 510 located within the staining apparatus 500, such that each housing portion 100, 200 will be received within a corresponding one of the adjacent pair of channels 510 when the cassette 10 is loaded within the staining apparatus 500.

To facilitate opening of the housing from the closed configuration to the open configuration, the second housing portion 200 includes a tab 288 that extends upwardly from an upper surface of the portion 280 formed at the second end of the second housing portion 200. In use, an operator can simply hold the body portion 320 of the handle 300 and gently pull the tab 280 to release the housing from the closed configuration.

The cassette 10 may include an additional locking means to lock the two housing portions 100, 200 in position when the housing is in the open configuration.

Figure 12:
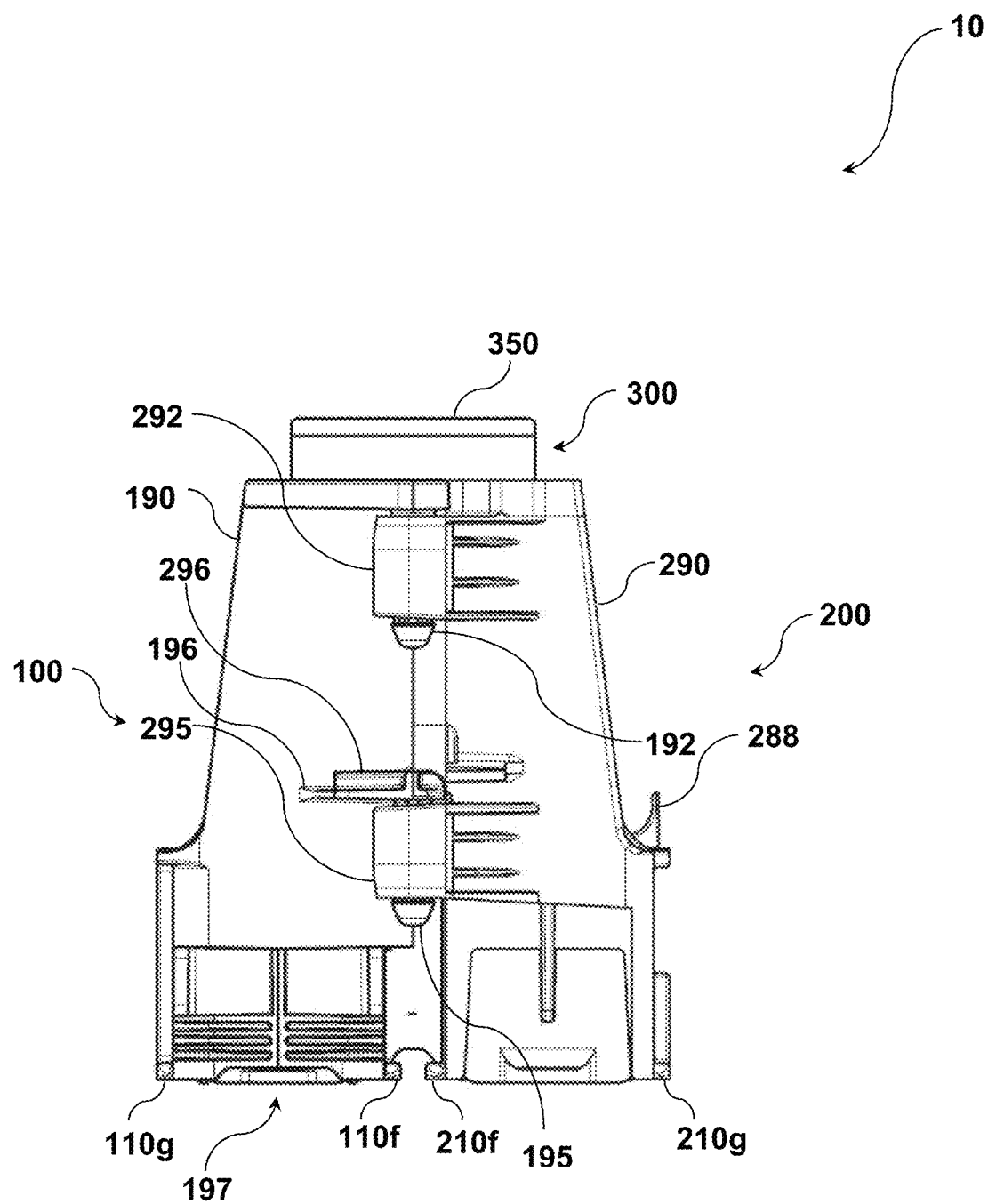
FIG. 12 shows an end view of the reagent cassette of FIG. 1 in a closed configuration, when viewed from the front.
Figure 13:
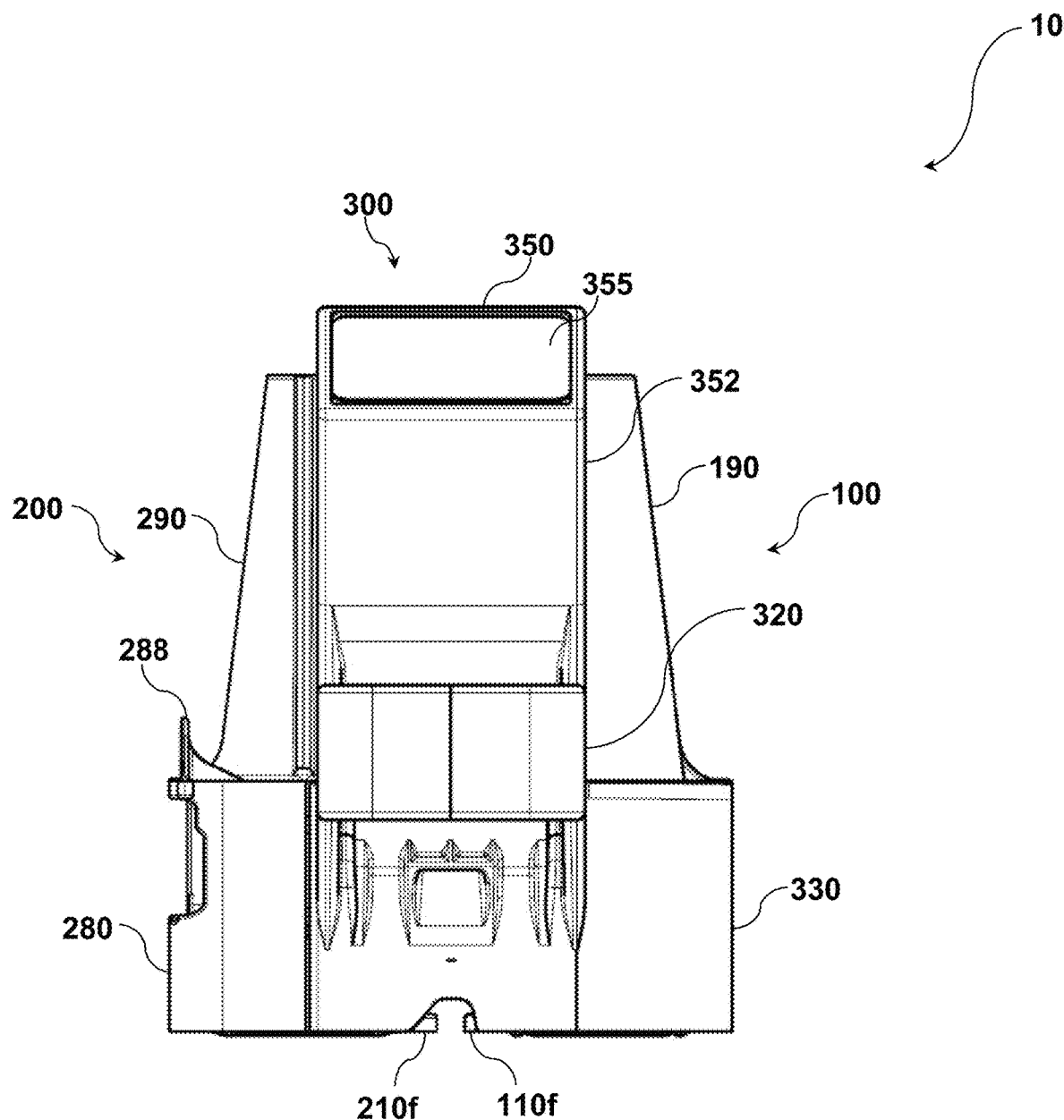
FIG. 13 shows an end view of the reagent cassette of FIG. 1 in a closed configuration, when viewed from the rear.

In one embodiment, and as shown in FIGS. 2, 4 and 12, the additional locking means takes the form of a snap-fit arrangement, in which the second housing portion 200 includes a cantilever hook 296 extending from an external surface of the bracket 290, at a location that is between the two barrels 292, 295.

While the first housing portion 100 includes a complementary lip 196 extending from an external surface of the bracket 190, at a location that is between the two downwardly angled snap lock pins 192, 195, which is configured to engage the cantilever hook 296 when the housing is in the open configuration.

The cantilever hook 296 is sufficiently flexible to enable an operator to release the cantilever hook 296 from the lip 196 by applying a gentle force to each of the two housing portions 100, 200 in a direction required to place the housing in the closed configuration.

Detent Pin

The cassette 10 is configured to enable it to be locked or held in position within the staining apparatus 500 when the housing is in the closed configuration.

In one embodiment, and as shown in FIGS. 2, 4, 7, 9 and 12, the first housing portion 100 includes a recess 197 extending through a base portion of the bracket 190 located at the first end of the first housing portion 100.

The staining apparatus 500 includes a plurality of spring-loaded detent pins (not shown) that are each slidably mounted within a corresponding generally vertical channel (not shown) positioned directly beneath one of the plurality of channels 510.

Thus, when the two housing portions 510 of the reagent cassette 10 are received within an adjacent pair of channels 510 of the staining apparatus 500, the spring-biased detent slidably mounted within the vertical channel directly below the channel 510 containing the first housing portion 100, is biased to move upwards along the vertical channel until a generally pointed upper portion of the detent pin locates substantially within the recess 197 extending through the base portion of the bracket 190 at the first end of the first housing portion 100. This provides a means by which to hold the reagent cassette 10 in place within the staining apparatus 500.

By virtue of the detent pins being spring-biased, it is possible to remove the reagent cassette 10 from the channels 510 of the staining apparatus 500 simply by pulling on the handle 300 of the reagent cassette 10. This action causes the base portion of the bracket 190 to act on the upper portion of the detent pin causing the detent pin to be forced downwards along the generally vertical channel, thereby allowing the reagent cassette 10 to be removed.

Solenoid Lock

When it becomes necessary to lock the reagent cassette 10 in place within the staining apparatus 500, then the locking mechanism by which to achieve this takes the form of a solenoid lock (not shown) located below the channels 510 of the staining apparatus 500.

Activation of the solenoid lock may occur when one or more sensors (not shown) associated with one or both of an adjacent pair of channels 510 located within the staining apparatus 500, determines the presence of a corresponding one of the two housing portions 100, 200 of the housing (in the closed configuration) located within the corresponding channels 510 when the cassette 10 is loaded into the staining apparatus 500.

Specifically, the solenoid lock is activated upon receiving a signal from one of these sensor(s) when it detects that the cassette 10 has been loaded into the staining apparatus 500. This produces an electromagnetic field that causes a metal bolt (not shown) moveably mounted relative to a body of the solenoid lock to transition from a retracted position, where at least a portion of the metal bolt is located partially within the body of the solenoid lock, to an extended position where the metal bolt is repelled away from the body in a generally horizontal direction toward the spring-biased detent pin that is engaged within the recess 197 extending through the base portion of the bracket 190 at the first end of the first housing portion 100. The metal bolt in the extended position is located directly below the engaged spring-biased detent pin, which prevents the detent pin from being forced downwards by the base portion of the bracket 190 acting on the upper portion of the spring-biased detent pin when a pulling force is applied to the reagent cassette 10 by an operator, thereby locking the reagent cassette 100 in place within the staining apparatus 500.

In addition to the solenoid lock, the flanges 110f, 110g and 210f, 210g that extend outwardly from the corresponding base 110, 210 of each of the housing portions 100, 200 not only restrict lateral movement of the cassette 10 within the staining apparatus 500 that would prevent the software-controlled probe from being positioned accurately to engage the opening in each of the reagent containers (see, for example, the lidded reagent containers shown in FIG. 15). The flanges 110f, 110g and 210f, 210g also help to restrict vertical movement within the channels 510 of the cassette 10 within the staining apparatus 500 that may occur when the detent pin is engaged within the recess 197.

To release the reagent cassette 10 from the locked state, an operator is simply required to deactivate the solenoid lock at a control panel (not shown) of the staining apparatus 500. This removes the electromagnetic field, causing the metal bolt to transition from the extended position back to the retracted position, thereby allowing the engaged spring-biased detent pin freedom to move freely within the vertical channel.

In an alternative arrangement, the solenoid lock may simply be a latching solenoid, where power is momentarily applied to cause the metal bolt to transition from the retracted position to the extended position, and then when the power is removed, the metal bolt is maintained in the extended position. To release the metal bolt, the opposite voltage is applied to the latching solenoid, which causes the metal bolt to transition back to the retracted position, where it is maintained until such time as power is applied again.

As indicated above, when the cassette 10 is loaded into the staining apparatus 500, each compartment Xa-Xj is positioned at a predetermined location within the channels 510 of the staining apparatus 500, such that the probe (not shown) associated with the staining apparatus 500 can be controlled by software to locate the opening of a particular reagent container received within one of the compartments Xa-Xj with positional accuracy. Once the probe is in the correct location, the software program causes the probe to be lowered through the opening of the reagent container to enable a reagent to be withdrawn therefrom by suction.

Advantages

The reagent cassette 10 according to the preferred embodiments of the present invention described above provides a number of benefits.

For instance, when the housing is in the closed configuration, the two housing portions 100, 200 are sufficiently spaced apart from each other to be loaded into an adjacent pair of channels 510 within the staining apparatus 500. This is beneficial as a conventional staining apparatus 500, which is configured to receive a plurality of individual cassettes, does not need to be modified to accommodate, for want of a better term, the "foldable" reagent cassette 10 of the present invention.

In addition, the reagent containers manufactured for use with the conventional staining apparatus 500 typically include a lid that is pivotably coupled to one of the side walls of the reagent container for use in covering the opening when the reagent container is not in use (see, for example, the lidded reagent containers shown in FIG. 15). These lids must be opened to reveal the opening before the reagent cassette 10 can be loaded into the staining apparatus 500. However, since the reagent containers must be loaded into the compartments Xa-Xj of the two housing portions 100, 200 in a particular orientation, such that they face the same way when located in the channels 510 of the staining apparatus 500, as would be the case if two separate reagent cassettes were used, it is possible to open the lids of the reagent containers when the housing is in the open configuration, as the two housing portions 100, 200 are too close together when the housing is in the closed configuration to allow the lids of the reagent containers in the compartments Xf-Xj in the second housing portion 200 to be opened.

Other Embodiments

In other embodiments, the two portions 100, 200 of the housing may be manufactured from a metal, preferably a medical grade metal, such as 316 stainless steel.

Definitions

Whenever a range is given in the specification, for example, a temperature range, a time range, or concentration range, all intermediate ranges and subranges, as well as all individual values included in the ranges given are intended to be included in the disclosure. It will be understood that any subranges or individual values in a range or subrange that are included in the description herein can be excluded from the claims herein.

All definitions, as defined and used herein, should be understood to control over dictionary definitions, definitions in documents incorporated by reference, and/or ordinary meanings of the defined terms.

Throughout this application, the term "about" is used to indicate that a value includes the inherent variation of error for the device, the method being employed to determine the value, or the variation that exists among the study subjects.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed.

Where the terms "comprise", "comprises", "comprised" or "comprising" are used in this specification they are to be interpreted as specifying the presence of the stated features, integers, steps or components, but not precluding the presence of one or more other features, integers, steps or components, or group thereof.

The invention claimed is:

1. A cassette for arranging and loading reagent containers into a staining apparatus, the cassette including:
    a housing with a base and walls upstanding from the base to define a plurality of compartments, each compartment being configured for receiving a reagent container,
    wherein, the housing includes two portions, pivotably coupled together at respective first ends thereof, and configured to pivot between an open configuration and a closed configuration,
    wherein, each portion of the housing in the closed configuration is receivable within a corresponding one of an adjacent pair of channels located within the staining apparatus when the cassette is loaded therewithin,
    wherein each portion of the housing includes at the location of each compartment, an aperture extending substantially through a wall thereof to at least partially receive a corresponding protrusion of a reagent container received within the compartment to ensure that the reagent container is correctly placed within the compartment,
    wherein the wall of each housing portion is a side wall, and wherein only the apertures associated with one of the two housing portions are externally facing when the housing is in the closed configuration, and
    wherein more of the apertures are extended through the side wall than through an opposite wall of each housing portion, the opposite wall being opposite to the side wall of each housing portion.

2. A cassette according to claim 1, wherein each reagent container includes a lid pivotably coupled to a wall of the reagent container, and the cassette is configured such that only when the housing is in the open configuration can the lids of those reagent containers received within the compartments associated with both of the two housing portions be opened.

3. A cassette according to claim 1, further including locking means to lock the two housing portions in position when the housing is in the closed configuration.

4. A cassette according to claim 3, wherein the locking means is located at respective seconds ends of each of the two housing portions.

5. A cassette according to claim 4, wherein the locking means takes the form of a snap-fit arrangement, in which the second end of one housing portion includes a cantilever hook and the second end of the other housing portion, includes a complementary recess configured to receive the cantilever hook when the housing is in the closed configuration.

6. A cassette according to claim 1, wherein, when the housing is in the closed configuration, the two housing portions are spaced apart from each other by a predetermined distance that corresponds to the spacing between the adjacent pair of channels located within the staining apparatus.

7. A cassette according to claim 6, wherein the base extends outwardly from opposing lateral side walls of the housing to define a pair of flanges such that when the housing is in the closed configuration, the flanges of each portion of the housing can be slidingly received by a corresponding pair of laterally opposing alignment guides associated with each of the adjacent pair of channels located within the staining apparatus when the cassette is loaded substantially therewithin.

8. A cassette according to claim 1, wherein at least one of the two housing portions includes a recess configured to receive a spring-biased detent pin and the staining apparatus comprises a solenoid lock, the detent pin being configured to be actuated by the solenoid lock, to lock the cassette substantially in place within the staining apparatus when the cassette is loaded substantially therewithin.

9. A cassette according to claim 8, wherein the recess is located at the first end of the at least one housing portion and/or the recess extends through a portion and/or the recess extends through a portion of the base associated with the at least one housing portion.

10. A cassette according to claim 1, further including a handle to facilitate loading and unloading of the cassette into and out of the staining apparatus.

11. A cassette according to claim 10, wherein the handle is located at a second end of the housing portion that includes a recess located at the first end thereof and/or the handle includes a display panel for displaying an identifier associated with the identity of the plurality of reagent containers loaded within the compartments thereof.

12. A cassette according to claim 1, further including locking means to lock the two housing portions in position when the housing is in the open configuration.

13. A cassette according to claim 12, wherein the locking means is located at respective first ends of each of the two housing portions and/or the locking means takes the form of a snap-fit arrangement, in which the first end of one housing portion includes a cantilever hook and the first end of the other housing portion includes a complementary lip configured to engage the cantilever hook when the housing is in the open configuration.

14. A cassette according to claim 1, wherein, each channel of an adjacent pair of channels located within the staining apparatus includes a sensor configured to determine the presence of a corresponding one of the two housing portions when the cassette is loaded into the staining apparatus with the housing in the closed configuration.

15. A cassette according to claim 1, wherein, when the cassette is loaded into the staining apparatus, each compartment of the housing is positioned at a predetermined location within the staining apparatus, such that a probe associated with the staining apparatus can be inserted through an opening of the reagent container received within each compartment with positional accuracy to withdraw a reagent therefrom.

16. A cassette according to claim 1, wherein the housing is manufactured from an engineering polymer selected from the group including acrylonitrile butadiene styrene (ABS), polypropylene (PP), high density polyethylene (HDPE), polycarbonate (PC), polyvinyl chloride (PVC) and polytetrafluoroethylene (PTFE), or the housing is manufactured from stainless steel.

17. A cassette according to claim 1, wherein the walls defining each of the plurality of compartments include at least one rib to provide a frictional fitting with the reagent container when the reagent container is received therein.

18. A cassette according to claim 1, wherein the base includes a draining aperture at the location of each of the plurality of compartments.

19. The cassette according to claim 1, wherein the opposite wall is absent any of the apertures.

20. An apparatus, comprising:
a staining apparatus having a plurality of channels therein; and
a cassette including:
a housing with a base and walls upstanding from the base to define a plurality of compartments, each compartment being configured for receiving a reagent container,
wherein, the housing includes two portions, pivotably coupled together at respective first ends thereof, and configured to pivot between an open configuration and a closed configuration,
wherein, each portion of the housing in the closed configuration is received within a corresponding one of adjacent pair of channels located within the staining apparatus when the cassette is loaded therewithin, and
wherein more apertures are extended through a side wall of each of the housing portions than through an opposite wall, the opposite wall being opposite to the side wall of each of the housing portions.

* * * * *